United States Patent
Dulin et al.

[11] 3,876,537
[45] Apr. 8, 1975

[54] METHOD OF INSOLUBILIZING DEMINERALIZER AND COOLING TOWER BLOWDOWN WASTES

[75] Inventors: Jacques M. Dulin, Libertyville, Ill.; Edward C. Rosar, Lakewood, Colo.; Harvey S. Rosenberg, Columbus; Joseph M. Genco, Gahanna, both of Ohio

[73] Assignee: Industrial Resources, Inc., Chicago, Ill.

[22] Filed: Oct. 31, 1973

[21] Appl. No.: 411,365

[52] U.S. Cl. .................................. 210/15; 210/50
[51] Int. Cl. ......................... C02c 5/00; C02c 5/04
[58] Field of Search .......... 106/286; 210/21, 22, 45, 210/51, 52, 56, 50, 15

[56] References Cited
UNITED STATES PATENTS

| | | | |
|---|---|---|---|
| 1,310,384 | 7/1919 | Auld et al. | 210/45 |
| 2,798,802 | 7/1957 | Roy et al. | 210/45 |
| 3,522,173 | 7/1970 | Lindman et al. | 210/45 |
| 3,575,853 | 4/1971 | Gaughan et al. | 210/50 |
| 3,694,356 | 9/1972 | Vander Horst | 210/51 |

*Primary Examiner*—Allan Lieberman
*Attorney, Agent, or Firm*—Jacques M. Dulin, Esq.

[57] ABSTRACT

Process for insolubilizing water soluble sodium sulfur oxide wastes resulting from backwash of process feed-water demineralizers and cooling tower blowdown wastes. The sodium sulfur oxide wastes, typically sodium sulfate and sulfite, are reacted in solution with ferric ions and sulfuric acid to produce an insoluble, basic hydrous or anhydrous sodium hydroxy ferric sulfate or sulfite compounds of the type $Q_vFe_w(SO_x)_y(OH)_z \cdot nH_2O$, wherein Q is $NH_4$ or Na, $v$ is 1, 2, 4 or 5, $w$ is selected from 1, 2, 4 or 6, $x$ is 3 and/or 4, $y$ is 2, 4, 5 or 7, $z$ is 1, 2, 3, 6, or 12, and $n$ is 0 or 3. The principal insoluble compounds include Natrojarosite, Metasideronatrite, Sideronatrite, Depegite which is a mixture of Sideronatrite, Rosarite and Iriite, and mixtures thereof. The reaction takes place at an acid pH in a temperature ranging from about 50°–300°F and may occur in single or multistage reactors. Air and/or bacterial activation at a pH of less than about 5.5 may be employed. The end-product basic, sodium hydroxy ferric sulfate and sulfite compounds are substantially water insoluble, having a solubility of less than the standard calcium sulfate, and may be disposed of by simple landfill without the water pollution hazards inherent with landfilling of wet or dry sodium sulfite or sulfate wastes.

22 Claims, 5 Drawing Figures

METHOD OF INSOLUBILIZING DEMINERALIZER AND COOLING TOWER BLOWDOWN WASTES

RELATED CASE

This application is related to our co-pending application, Ser. No. 353,508, filed Apr. 23, 1973 and titled PROCESS FOR INSOLUBILIZING POTENTIALLY WATER POLLUTABLE WASTES FROM SODIUM OR AMMONIUM TYPE SULFUR DIOXIDE AIR POLLUTION CONTROL SYSTEMS now abandoned in favor of continuation-in-part application Ser. No. 411,367, filed Oct. 31, 1973. The disclosure of that application is hereby incorporated by reference.

FIELD

The invention relates to insolubilizing wastes from the treatment of water for biological, agricultural, chemical or process use such as demineralizer treatment of boiler feedwater, and wastes resulting from blowdown of cooling towers. More specifically, this application relates to reducing the solubility of sodium sulfite and sulfate wastes by a factor of $10^3$ to $10^4$ to produce a solid product which may be simply disposed of by landfilling without posing serious water pollution problems. The end-products may be characterized as basic, insoluble ammonium or sodium hydroxy ferric sulfate and sulfite compounds which may be in an anhydrous or a hydrated state. The typical source sodium sulfate or sulfite wastes may be demineralizer wastes from boiler feedwater prepared for nuclear or fossil fired fuel power plants and the blowdown sludge from nuclear or fossil fired fuel power plants.

BACKGROUND

As the emphasis on cleaning up water pollution sources increases, sodium sulfate and sulfite compounds have been recognized as posing difficult problems for disposal. The sodium sulfate and sulfite compounds are normally highly soluble in water, on the order of 200 grams per liter at normal, ambient conditions. The sodium salinity represents serious problems from the point of view of agricultural use, and excess sodium in river waters such as the Colorado River violate international treaties if permitted to exceed stated limits. There are currently proposals for cleanup of such rivers which cleanup represents a national investment in excess of $500 million.

Further, in many agricultural or industrial processes water must be treated, i.e., demineralized, prior to use because ambient water sources are already too dirty and introduce cations and anions which interfere with physical or chemical processes. For example, boiler feedwater must be demineralized because contents of sodium, sulfate, chloride, silica and other anions and cations lead to boiler tube failure, scaling and the like. Thus, lake and river feedwaters are normally treated today by a series of anion and cation exchange beds to thoroughly demineralize the water and prepare it as a feedwater for boiler, condenser, and makeup feedstock water. These resins are periodically backflushed, i.e., recycled, and the backwash wastes can contain 15-25,000 ppm sodium sulfate. These exceed current limits proposed for sodium sulfate effluents into natural streams.

Another area of need is in connection with cooling towers for various types of commercial and industrial processes. For example, commercial air conditioning cooling involves packed or hyperbolic type cooling towers in which a certain percentage of the water is recycled. A slipstream or blowdown stream is removed from the cycling waters as it gets more concentrated due to the recycle of the water through the cooling tower. This problem is highly aggravated where very large cooling towers are used in connection with fossil fuel fired or nuclear power plants. For example, a nuclear station generating approximately 2,000 megawatts may have a cooling tower involving a circulating water system employing 1.096 million gallons per minute and makeup water on the order of 56,000 gallons per minute. Approximately 36,220 gallons per minute are lost by evaporation or drift. For every 4,500 gallons per minute of the water passing through softeners, a blowdown sludge or magma in the amount of approximately 3.4 tons per hour of 90 percent solids containing approximately 8,400 parts per million sodium sulfate is removed. This is 15 tons of magma per megawatt per year.

As the nation's power needs increase, and thermal pollution codes require an increasing number of cooling towers to be used in connection with power or industrial plants and environmental air conditioning, the amount of this waste sludge material will increase.

In a sense, the thermal pollution problem and the cleanup of already dirty water streams to the purity required for industrial processing, has generated still another pollution problem: a water pollution problem. This problem is not solved by merely drying the sludge materials because disposal of the dry materials are still prone to leaching and finding their way back into the ambient groundwater unless their solubility is substantially reduced.

Therefore, there is a real need for a process for reducing the solubility of sodium sulfite and sulfate wastes from concentration of these compounds in industrial power and processing operations, and which results in a material which can be readily landfilled without posing the potential water pollution currently posed by such wastes.

THE INVENTION

OBJECTS

It is among the objects of this invention to provide a process for reducing the solubility of sodium sulfite and sulfate wastes.

It is another object of this invention to provide a process for reducing the solubility of sodium sulfite and sulfate wastes resulting from industrial water preparation operations and power plant cooling tower blowdown.

It is another object of this invention to produce a double salt or co-precipitate of ferric sulfate and sodium sulfite and sulfate wastes which end-products are reduced in solubility more than one-hundred fold from the starting sodium sulfate or sulfite materials.

It is another object of this invention to provide a simple process at relatively mild conditions which results in a relatively insoluble end-product which can be easily landfilled and which does not pose the problems of a water-retaining sludge material.

Still other and further objects of the invention will be evident from the description which follows.

SUMMARY

Sodium sulfite or sulfate-containing solutions, derived from demineralizer or blowdown wastes are reacted abiotically or biotically in a single or multi-stage reaction with ferric sulfate solutions, derived in turn from an iron-containing source in a sulfuric acid-containing liquid at a temperature between about 50°-300°F at an acid pH to produce sodium hydroxy ferric sulfite or sulfate products which may be anhydrous or hydrated. These end-products are generally crystalline, water insoluble (as compared to calcium sulfate), and may be easily dewatered and dried, and thereafter landfilled, without posing severe water pollution problems.

The sodium sulfate or sulfite-containing solution is passed into a single or multi-stage reaction tank which is generally maintained in the temperature range of from about 50°-300°F at an acid pH, generally below about 5.5 and preferably in the range of below about 3.5. A ferric sulfate or a ferrous sulfate material or solution may be charged into the reactor. The reaction may occur in the presence of air and/or bacterial activation as optional conditions. In the alternative, elemental iron in the form of high iron content groundwater, scrap iron, steel furnace dust, iron-containing fly ash, iron wastes from local municipal incinerators, iron-containing slag, iron pyrites from coal washings, mine waters containing iron, or industrial process wastes containing iron may be used as a source of iron ($Fe°$), ferric ion, or ferrous ion. In addition, a source of sulfuric acid, alone or in combination with the iron charge, is introduced to the reactor. Typical sources of the sulfuric acid include sulfuric acid from other pollution control processes such as are employed in smelter operations, industrial waste waters containing sulfuric acid, mine waters such as black water, or sulfuric acid from a side stream of the flue gases of fossil fuel burning power plants or boilers. If sulfuric acid is employed, it may be of an extremely crude type of relatively low concentration. Pickle liquors or pyrite or gob dump leachate are good sources of ferrous/ferric ion and sulfuric acid values.

The reaction is maintained in a tank for a time sufficient to produce the sodium hydroxy ferric sulfite or sulfate insoluble products which precipitate at the bottom of the tank, typically in 10 minutes to 3 days and preferably 30 minutes to 24 hours. The tank may be operated at a variety of pressures, sub- or super-atmospheric, but ambient atmospheric pressure is preferred. Air may be bubbled through the reactor in order to promote the conversion of elemental iron to ferric ion, and/or to promote bacterial activation of the reactions.

The reaction tank may be operated abiotically, or optionally can be charged with one or more bacterium of the type which oxides sulfur and iron. For example, one or more iron bacterium of the genus Thiobacillus (*ferrooxidans, thiooxidans, concretivorous, neopolitanus,* or *thioparous*), Ferribacillus *ferrooxidans*, or an acid-tolerant filamentous iron bacterium of the genus Metallogenium may be employed. Bacteria other than those mentioned may also be employed.

Generically, the compounds produced in accordance with the instant process may be described as hydrous (hydrated) or anhydrous, insoluble basic hydroxy ferric sulfites and sulfates, or mixed sulfates which are represented by the formula $Q_v Fe_w(SO_x)_y(OH)_z \cdot nH_2O$, wherein $v = 0-5$, $w = 0-6$, $x = 3$ and/or $4$, $y = 1-5$, $z = 0-12$, and $n = 0-20$. Q is $NH_4$ or Na.

An analysis of the end-products shows that they may be generally classified as insoluble, as compared to the standard in the industry, calcium sulfate: 2.3 g/l at R.T. $CaSO_4$ has been taken as the standard in view of the fact that it is an end-product sought to be produced by air pollution control processes involving contact in a liquid system of lime or limestone with flue gases containing $SO_x$. Calcium has been the material of choice, in spite of severe problems internal to the scrubbers, because of the relative insolubility of the end-product calcium sulfate. The end-products of this invention are 10 to 100 times less soluble generally than the calcium sulfate. This is a reduction in solubility of approximately $10^3$ to $10^4$ times as compared to the starting sodium sulfite/sulfate waste materials.

The end-product may be a mixed precipitate, the components of which vary depending on the pH of the reaction tank or tanks. For example, Sideronatrite $Na_2Fe(SO_4)_2OH \cdot 3H_2O$ and Metasideronatrite $Na_4Fe_2(SO_4)_4(OH)_2 \cdot 3H_2O$ may be produced at a pH of below about 2.0, while Natrojarosite $NaFe_3(SO_4)_2(OH)_6$, may be produced at a pH below about 4. Depegite $Na_5Fe_4(SO_3)_5(SO_4)_2(OH)_3 \cdot 3H_2O$, Rosarite $Na_2Fe(SO_3)_2OH \cdot 3H_2O$, and Iriite $NaFe_3(SO_3)_2(OH)_6$ may be produced at a pH between about 2.2 – 5.5. Depegite appears to be an empirical "compound" containing Sideronatrite, and Rosarite and Iriite, which are sulfite analogs of Sideronatrite and Natrojarosite.

The presence of other metal cations such as copper, lead, silver, zinc and the like naturally present in these waste waters do not interfere. Indeed, such metallic ions can be scavenged by co-precipitating with the above sodium compounds, as for example Argentojarosite $AgFe_3(SO_4)_2(OH)_6$, Beaverite $Pb(Cu,Fe,Al)_3(SO_4)_2(OH)_6$, Plumbojarosite $PbFe_6(SO_4)_4(OH)_{12}$, and the sulfite analogs.

FIGURES

The detailed description which follows has reference to the drawings in which like parts have like numbers and wherein.

DETAILED DESCRIPTION

The detailed description of the embodiments of this invention are by way of illustration and not by way of limitation of the present process.

Figure 1:
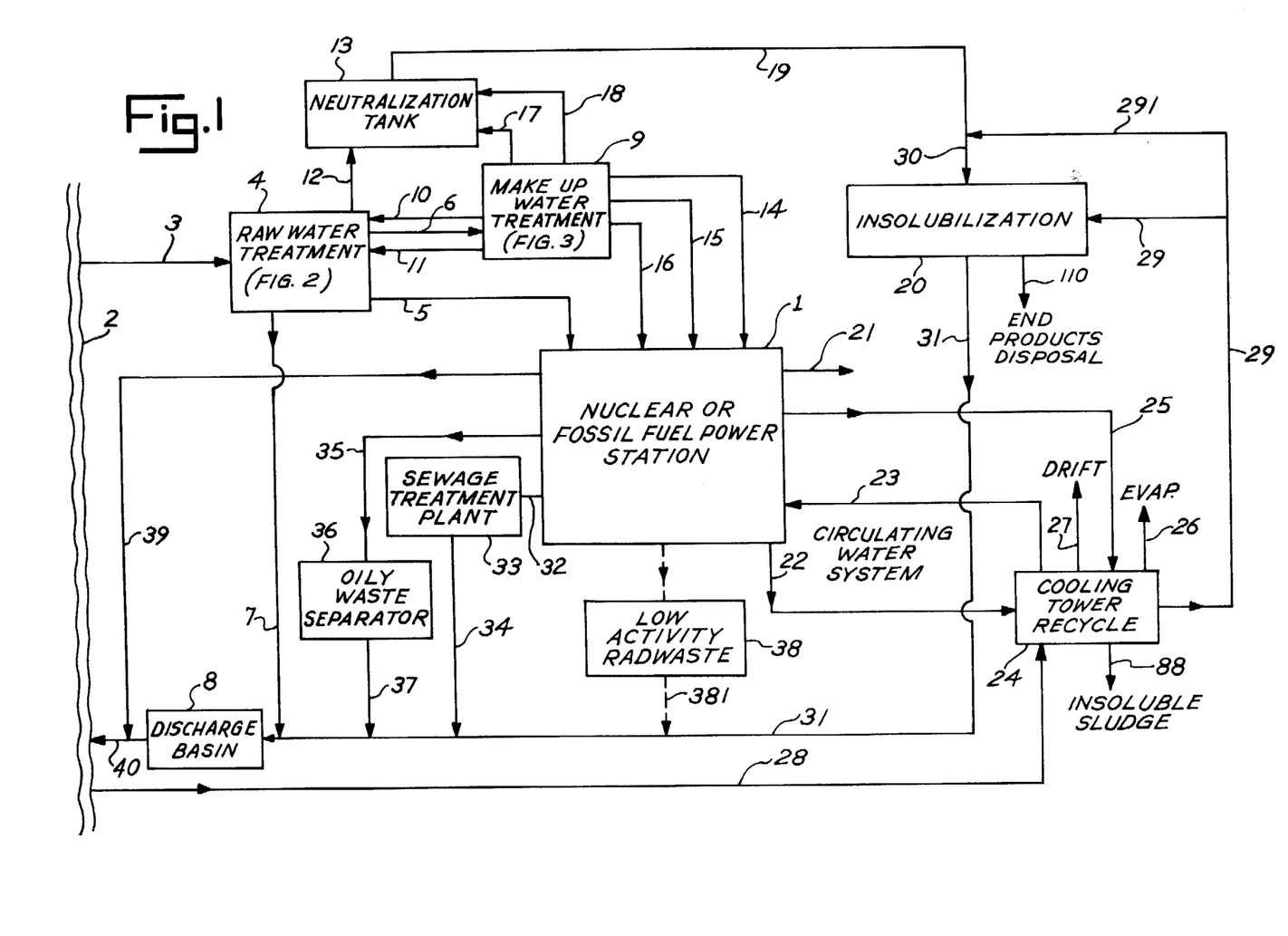
FIG. 1 is an overall schematic flowsheet of the application of the invention to a power plant which produces both demineralizer and blowdown wastes.

Referring to FIG. 1, an industrial or power plant 1 employs service water from river 2 via service water intake line 3. As shown in these figures, the plant is a power station, more particularly a nuclear or fossil fuel station. As shown particularly in the figures, reference will be made to a nuclear power station, but it should be understood that other power stations or industrial plants employing demineralizing water treatment systems and/or cooling tower systems are encompassed within the scope of this invention. It should also be understood that the water source need not be river 2, but may be a lake, well water, reservoir water, or ocean.

Figure 2:
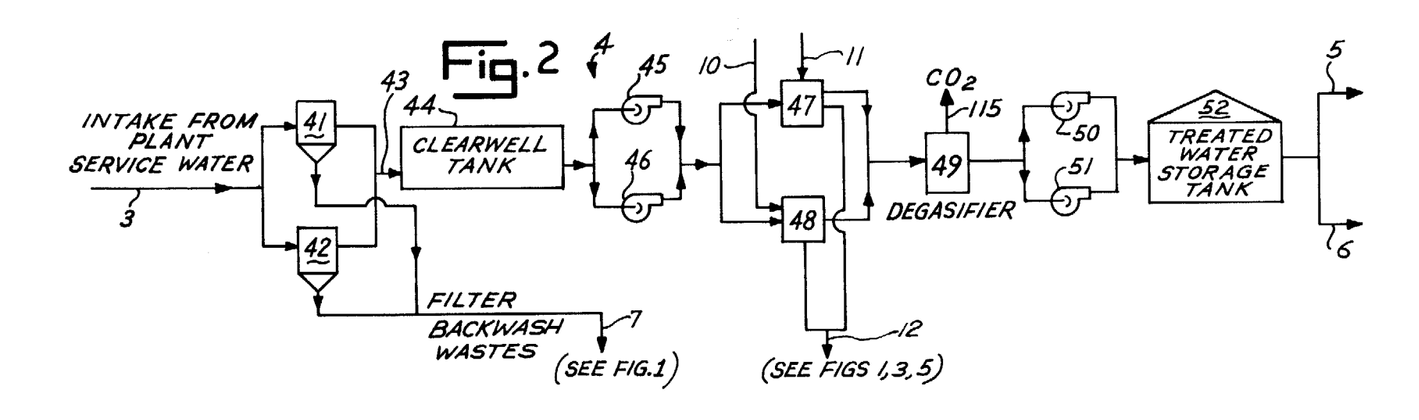
FIG. 2 is a schematic flowsheet of the raw water treatment portion of the station water use operation shown in FIG. 1.

The raw service water drawn in through intake line 3 is passed through a raw water treatment plant 4 which is shown in more detail in FIG. 2. The water is filtered, passed through cation exchange resins, degasified, and stored before being distributed to domestic water system 5 and as feedstock for the makeup water treatment system 6 set forth in FIG. 3. Filter backwash wastes are passed via line 7 to discharge basin 8.

Figure 3:
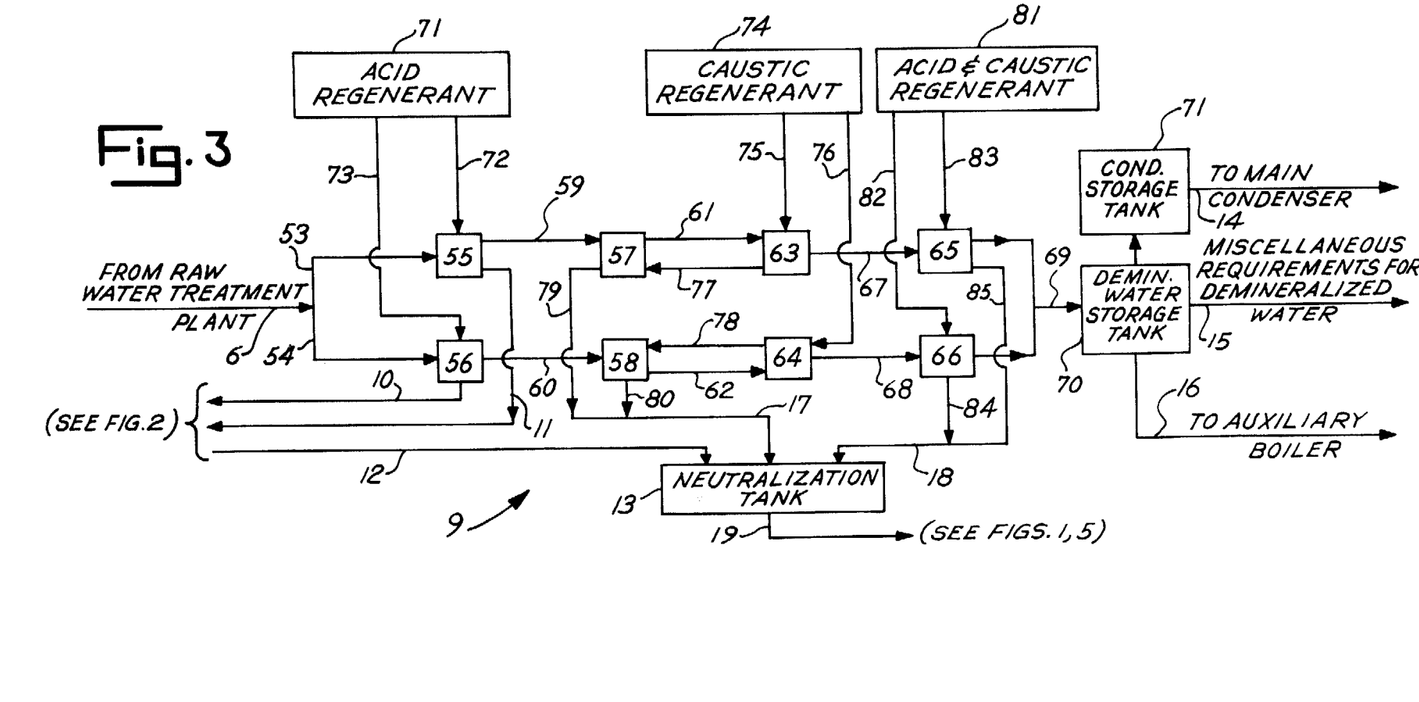
FIG. 3 is a schematic flowsheet of the makeup water treatment system and chemical effluents portion of the station water use flow diagram shown in FIG. 1.

Approximately three-fifths of the raw water treated in plant 4 is directed via line 6 to the makeup water treatment system 9, which is described in more detail with respect to FIG. 3. Discharge from acid regeneration of strong cation exchangers in system 9 are recycled via lines 10 and 11 back to raw water treatment system 4 wherein they are used to regenerate the weak cation exchange resins. The resultant discharge is directed via line 12 to neutralization tank 13. In makeup system 9, the processed raw water feed in line 6 is treated sequentially in strong acid cation exchangers, weak base anion exchangers, strong base anion exchangers and mixed bed demineralizers, as will be explained in detail below, prior to storage and distribution via line 14 to the main condenser, line 15 for miscellaneous demineralized water requirements (laboratory, regeneration, auxiliarly processing, etc.), and line 16 to the auxiliary boiler. Discharge 17 from the strong and weak base anion exchangers, and discharge 18 from the mixed bed demineralizers are distributed to the neutralization tank 13. The various discharges 12, 17 and 18 tend to neutralize themselves in tank 13 and the effluent is discharged via line 19 to the insolubilization system described in more detail below with respect to FIG. 5. In the alternative, acid discharges from lines 12, 17 and 18 may be passed directly to reactor tank 98 (see FIG. 5).

The prepared water in lines 5, 14, 15 and 16 are utilized in the plant 1 in a conventional manner. This aspect of the prepared water use is not part of this invention. In producing product 21, here power, the plant 1 produces excess heat which is dissipated by a circulating water system 22, 23 and cooling tower system 24, which is described in detail below with respect to FIG. 4. Service water discharge 25 may be used as makeup for the cooling tower requirements. The cooling tower operates to evaporate water 26 in cooling and some is lost as mist or drift 27. Direct use of river water 1 via line 28 may also be employed as cooling tower main or makeup water source. The cooling tower evaporative system also discharges a sodium sulfate-rich (10–25,000 ppm) blowdown magma of approximately 90 percent solids which is directed via line 29 to the insolubilization system 20. The magma 29 and sodium sulfate-rich neutralization tank effluent 19 may be directed separately to the insolubilization system 20, or via line 291 combined as a single sodium sulfate-rich feed stream 30 to the insolubilization 20.

Clarified stream 31 exiting from the insolubilization 20 is fed to discharge basin 8. Sanitary wastes from the station facilities are treated in sewage treatment plant 33 with treated effluent 34 being sent to discharge basin 8. Non-radioactive wastes 35 from the administrative building plant, warehouse and shop are treated to separate oily wastes in separator 36 with effluent 37 to discharge basin 8. These treatments are conventional and do not form a part of this invention. Likewise, in the case of a nuclear station, low activity radioactive waste is conventionally treated with ion exchange resins 38, and the decontaminated effluent 381 is directed to discharge basin 8, bypassing the insolubilization operation 20 (shown in dashed lines in FIG. 1). This radioactive waste, and high activity radioactive waste may be treated by conventional processes for disposal and does not form a part of this invention. Runoff waters 39 from storm and roof drains are discharged to the ambient water source 2, as is the flow 40 from discharge basin 8.

Turning from this overview of the water sources and discharges from a station in normal full power operation to the detailed treatment steps, FIG. 2 shows a conventional raw water treatment system 4. Raw water 3 is distributed to two upflow filter units 41, 42 to remove solids, and the backwashed solids wastes 7 are directed to the discharge basin 8 (FIG. 1). The filtered water 43 is transferred to clearwell tank 44, and then is pumped by transfer pumps 45, 46 through weak acid cation exchangers 47, 48 and degasifier 49 where excess $CO_2$ 115, is removed. Pumps 50, 51 transfer the treated water to storage tank 52. For regeneration of exchange resins 47, 48, the spent acid regenerant used to regenerate the strong acid cation resins in the makeup water system 9 (FIGS. 1 and 3) is introduced via lines 10 and 11 to the weak acid cation exchangers 47, 48 during the regeneration cycle. The spent regenerant is combined in line 12 and transferred to the neutralization tank 13 (FIG. 3).

Turning now to FIG. 3, the makeup water feed stream 6 from the raw water treatment system 4 (FIG. 2) is divided in lines 53, 54 to pass through strong acid cation exchangers 55, 56, and then through weak base anion exchangers 57, 58 via lines 59, 60. After treatment in the weak base anion exchangers 57, 58 the treated water is passed via lines 61, 62 through strong base anion exchangers 63, 64, transferred to mixed bed demineralizers 65, 66 via lines 67, 68 and combined and collected via line 69 in demineralized water storage tank 70 and condenser water storage tank 71. As described above, the demineralized water in tank 71 is fed via line 14 to the main condenser, and both auxiliary boiler water and miscellaneous demineralized water requirements are withdrawn via lines 16 and 15, respectively, from storage tank 70.

The regeneration cycle of the exchange resins and demineralizer beds is as follows. Acid regenerant 71 is fed through the strong acid cation exchange resins in beds 55 and 56 via lines 72 and 73, with the partially spent acid and effluent in lines 10 and 11 being used as the regenerant for the cation exchange resins 47, 48 (in FIG. 2). Caustic regenerant 74 is passed via lines 75, 76 first through the strong base anion exchange resins in beds 63, 64 and the partially spent caustic in lines 77, 78 is then used as the regenerant for the weak base anion exchange resins in beds 57, 58. The spent regenerant containing exchanged ions in lines 79, 80 are combined in line 17 and sent to the neutralization tank 13. Acid and caustic regenerant 81 is passed via lines 82, 83 to mixed beds 65, 66, with the waste effluent withdrawn via lines 84, 85, combined in line 18 and sent to neutralization tank 13.

The chemical discharge in neutralization tank 13, representing the combined effluent of excess spent regenerants and released ions in lines 12, 17 and 18 would have the following typical composition shown in Table I.

TABLE I

Neutralization Tank Composition

| Component | Pounds/Day |
|---|---|
| Calcium | 140.0 |
| Magnesium | 71.0 |
| Potassium | 5.0 |
| Sodium | 355.0 |
| Arsenic | 0.041 |
| Silica | 25.0 |
| Chloride | 64.0 |
| Sulfate | 1,088.0 |
| Fluoride | 0.35 |
| Alkalinity | 120.0 |
| Total Hardness | 642.0 |
| Suspended Solids | 0 |
| Dissolved Solids | 1,821.0 |

Figures 4, 5:
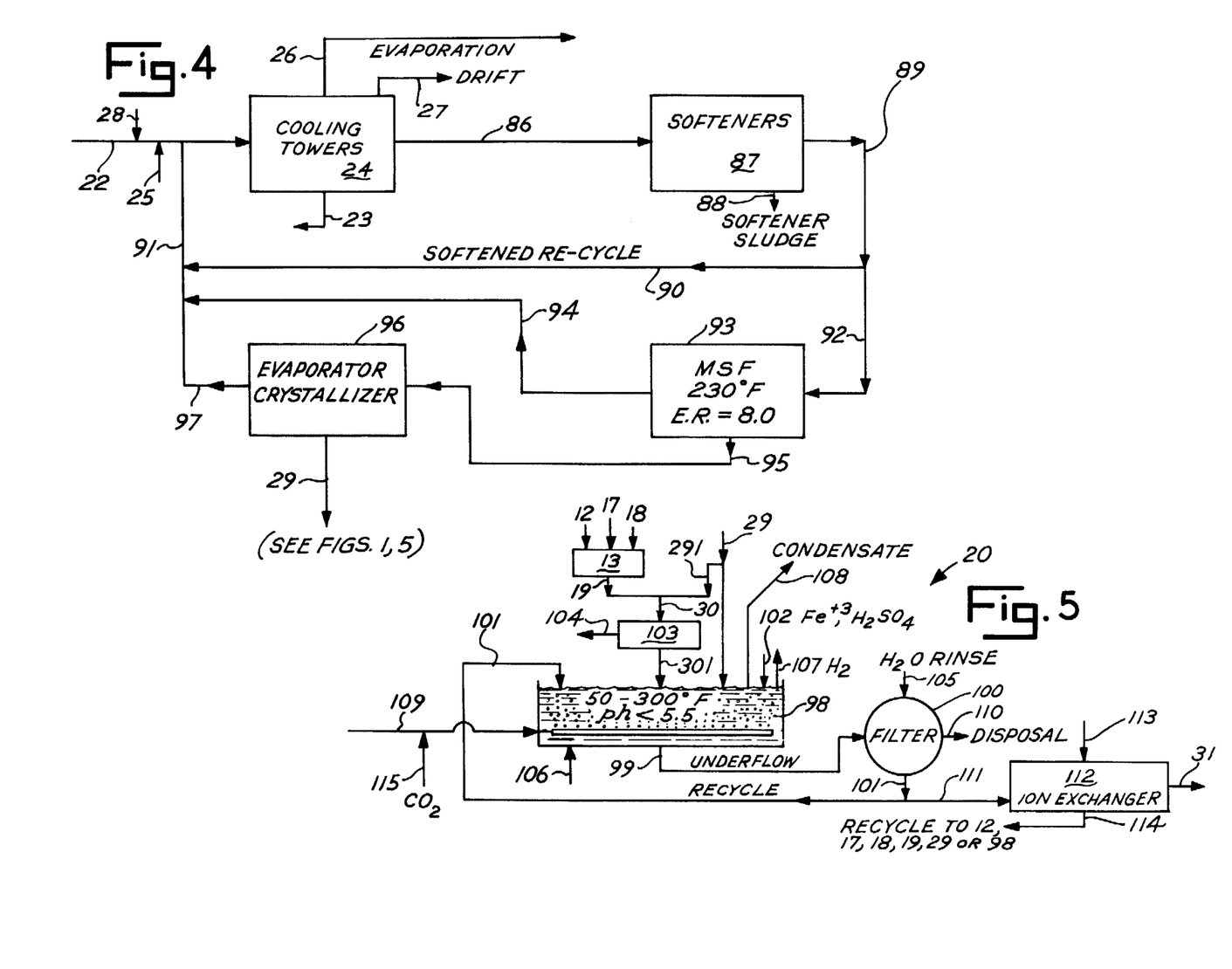
FIG. 4 is a schematic flowsheet of the cooling tower portion of the station water use operation shown in FIG. 1.
FIG. 5 is a schematic of the insolubilization reaction tank portion of the process.

This is treated in the insolubilization tank 20 described in more detail below. It should be understood that the above values depend on the type of raw water source 2, and only the effluent 12 from the cation exchangers and/or the effluent from the anion exchangers 17 need be treated. Typical ranges are shown in Table II with both weights and ppm represented as equivalent to $CaCO_3$ per day (per regeneration):

TABLE II

| Water Source<br>Waste | Colorado River | | Well | | Great Lakes | |
|---|---|---|---|---|---|---|
| | lb | ppm | lb | ppm | lb | ppm |
| I From Cation Exchangers | | | | | | |
| $Ca^{+2}$ | 172 | 1,180 | 48.2 | 1,780 | 35.1 | 1,740 |
| $Mg^{+2}$ | 146 | 1,020 | 18.7 | 692 | 79.9 | 3,950 |
| $Na^+$ | 2,132 | 14,900 | 426.0 | 15,800 | 209.4 | 10,350 |
| Total | 2,450 | 17,100 | 492.9 | 18,272 | 324.4 | 16,040 |
| II From Anion Exchangers | | | | | | |
| Alkali | 124 | 864 | 34.0 | 1,260 | — | — |
| $NO_3^-$ | — | — | 16.6 | 615 | — | — |
| $Cl^-$ | 226 | 1,590 | 15.5 | 575 | 3.6 | 178 |
| $SO_4^{-2}$ | 2,100 | 14,800 | 426.8 | 15,800 | 320.8 | 15,850 |
| Total | 2,450 | 17,254 | 492.9 | 18,250 | 324.4 | 16,028 |

These represent reasonable ranges of extremes represented by ambient water supplies. The $Na_2SO_4$ component is by far the greatest pollutant in the waste streams as seen from Tables I and II. In Table II, the ppm $Na_2SO_4$ can be approximated by multiplying the $Na^+$ or $SO_4^{-2}$ ppm (reported above as equivalent $CaCO_3$) by 1.5.

Ion-exchange resins are useful in the operation of nuclear reactors to produce makeup water of the requisite high purity, to control coolant activity levels, to minimize corrosion, and to remove or reduce the radioactivity present in a variety of low-level radioactive wastes. The makeup deionization system treats the clarified raw feed water to produce high-purity water for the core coolant. This system purifies the raw feedwater to supply high-quality reactor coolant makeup for either the boron-shimmed or non-shimmed pressurized or boiling water nuclear water reactors. The current trend is toward the use of the borated shim for pressurized reactors. The system also furnishes high-purity makeup water for the turbine side of the steam generator.

Quality requisites for the makeup water include specific conductivity less than 1.0 micromho/cm and a silica content no greater than 0.01 ppm. The specific pretreatment and ion-exchange system used to achieve these requirements varies with the quality of the raw water. With respect to deionization of the clarified raw water, a combination of multiple- and mixed-bed resins usually provides the required quality with operating economy. The following resins may be used in sequence: Duolite (Diamond Shamrock Chemical Co.) C-20 — A-102D (or A-30B), C-20 — A-101D, mixed bed of C-20 and A-101D, or equivalent. The first pair removes the bulk of the ionic impurities and the second pair polishes the first pair effluent to a high degree while the final mixed bed eliminates traces of ionic impurities. Regenerant economy is enhanced by utilizing excess caustic soda from regenerating the A-101D of the mixed bed to assist in regenerating the anion-exchange resins of the preceding pairs. If the source water contains appreciable amounts of organic matter, the deionization train may be preceded by a bed of absorbent resin (such as Duolite S-37) to minimize organic fouling of subsequent strong base anion exchangers in the train.

A full flow condensate purification ion-exchange system can be used to remove dissolved and suspended impurities which may result from condenser leaks or from corrosion/erosion of equipment. These impurities tend to concentrate in the reactor loop. Their removal serves to control radioactive content in the coolant and prevent crud deposition on core surfaces which reduces heat transfer and interferes with coolant circulation in the reactor.

A condensate ion-exchange unit also serves to remove minute quantities of silica which may escape from the makeup deionizer. It thus provides insurance against build-up in the turbine loop and consequent scaling of turbine blades and heat-exchange surfaces.

A mixed bed of Duolites ES-26 and ES-109 may be used for high flow-rate condensate polishing. This is a combination of macroporous cation exchanger and gelular anion exchanger. The Duolite ES-26 can be operated in the hydrogen form or the ammonium form, as needed for pH control. The Duolite ES-109 is used in its hydroxide form. The optimum screen analyses and chemical characteristics of these resins allow effective simultaneous filtration and deionization at flow rates up to 100 gpm/sq.ft.

Termination of the exchange resin runs are usually based on increased pressure drop due to "crud" removal rather than on conductivity breakthrough. Regeneration is usually conducted externally, i.e., the resins are transferred to separate regeneration vessels wherein they are "scrubbed" and chemically regenerated, and then returned to the exchanger vessels.

Turning now to FIG. 4, hot water from the plant in line 22 is piped to cooling tower 24 of the station for evaporative cooling and return via line 23. In its cooling operation, a portion of the water is lost via evaporation 26 and drift (mist) 27. As the water is evaporated the concentration of soluble and insoluble solids increases, for example, as shown in Table III:

TABLE III

| Component | Average Daily Concentration Increase in Cooling Tower Blowdown mg/l |
|---|---|
| Ca | 0.9 |
| Mg | 0.5 |
| K | 0.03 |
| Na | 2.2 |
| As | 0.003 |
| $SiO_2$ | 0.2 |
| $Cl^-$ | 0.4 |
| $SO_4^{-2}$ | 6.6 |
| $F^-$ | 0.0002 |
| Alkalinity | 0.9 |
| Total Hardness | 4.0 |
| Suspended Solids | 5.8 |
| Dissolved Solids | 11.2 |

Therefore, a slipstream portion 86 of the recycling water must be continuously removed and purified before return to the circulating water system 22, 23. As needed, makeup water is supplied to the tower from the service water discharge 25, or direct from the ambient water source via line 28.

The slipstream 86 is passed through softeners containing ion exchange resins for removal of hard water ions, and results in a softened blowdown stream 89 and an insoluble softener sludge 88 which may be landfilled by conventional techniques. In a circulating water system 22, 23 of 1,096,000 gpm, the blowdown stream will amount to about 4,490 ppm (.45%) and is at approximately 90°F. Of this, 3,140 gpm (70%) is recycled via lines 90 and 91 to the cooling tower inlet line 22. The 30% balance of 1,350 gpm (679,000 lbs/hr) of the blowdown liquor in line 92 is then passed through a multi-stage flash evaporator 93 having an evaporation ratio of about 8.0 where the temperature is raised to 230°F from the 90°F inlet temperature. Approximately 2/3, or 900 gpm (450,000 lbs/hr) of water is evaporated off, recondensed and the purified condensate returned to the cooling tower inlet stream 22 via lines 94 and 91. The concentrated bottom liquor third 95 in the amount of 450 gpm (230,000 lbs/hr) is then passed to evaporator crystallizer 96 where 439 gpm (224,450 lbs/hr) of water are evaporated, recondensed and the purified condensate water returned to the cooling tower inlet 22 via lines 97 and 91. The residual magma or cooling tower blowdown sludge in line 29 amounts to 6,790 lbs/hr solids and 755 lbs of water (90% solids, 10% water) of the following composition (taken by sample from line 89 prior to concentration in line 29; line 29 magma has substantially the same composition, except for water content, as the line 89 liquor composition):

TABLE IV

| Blowdown Magma Composition | |
|---|---|
| Component | Amount (ppm) |
| Na | 3280 |
| $SiO_2$ | 30 |
| Ca | 20 |
| Mg | 12 |
| Cl | 885 |
| $SO_4$ | 5600 |
| Cu | 0.5 |
| Zn | 0.5 |
| Total | 9828 |

Turning to FIG. 5, the sodium sulfate-containing waste solutions 12, 18, 19 and 29 are delivered individually or mixed together via lines 291, 30 and 301 to insolubilization system 20, which comprises reaction tank 98, underflow line 99, filter 100, and recycle line 101.

The reaction tank is maintained at 50°–300°F at a pH below about 5.5, and a source of iron and sulfuric acid is added, as shown by line 102. The iron may be elemental Fe°, ferrous ion $Fe^{+2}$, or ferric ion $Fe^{+3}$ in solution, or supplied as a salt, preferably $Fe_2(SO_4)_3$. The sulfuric acid may be crude waste acid or any other source. The iron and acid may be added separately or together. A convenient source of waste acid and iron is acid mine water, pyrites dump leach water, or steel pickling liquor, all of which contain suitable concentrations of ferrous or ferric iron and sulfuric or sulfurous acid. Further details of the acid and iron sources are incorporated by reference from our co-pending application, Ser. No. 353,508, filed Apr. 22, 1973.

Where the sulfate wastes in line 30 are too dilute, an evaporator or evaporator crystallizer 103 may be used to increase the concentration of sodium sulfate in line 301, and condensate removed by line 104. This condensate may be used as the filter rinse water source 105. The feed in lines 29 and 301 is preferred to be highly concentrated or dry, so that by control of water input via line 101, the ionic concentration in the reactor 98 may be controlled.

The iron is preferred to be in the ferric ion form when delivered to the reactor tank 98. Where, however, the iron is available primarily or only as Fe° or ferrous ion, the process contemplates both abiotic iron oxidation and biotic oxidation with one or more bacteria of the genus Thiobacillus (*ferrooxidans*, *thiooxidans*, *concretivorous*, *neopolitanus*, or *thioparus*), the genus Ferribacillus (such as *ferrooxidans*), and acid-tolerant filamentous iron bacterium of the genus Metallogenium. The abiotic ferrous iron oxidation is directly dependent on the pH above 4.5, indirectly pH dependent between 3.5 and 4.5 and is relatively constant below at pH of 3.5. In general, abiotic ferrous iron oxidation is slower at a lower pH. For example, abiotic oxidation is approximately 8,200 times slower at a pH of 3.5 than at a pH of 5.5.

In the mesoacidic pH range of about 3.5 to 6.5, the Metallogenium bacterium and its heterotrophs are particularly suitable for iron or pyrite oxidation and degradation. As a result of the activity of the Metallogenium on the iron and sulfur present in the solution, the pH drops into the 3–4.0 range. The Metallogenium grows in multi-branching colonies of interweaving ferric ironencrusted stalks having a diameter of 0.1 to 0.4 microns. The stalks are characterized as not having a conventional cell body. The upper tolerance of the Metallogenium is approximately 150 micrograms per liter of ferrous iron produced as a result of the oxidation of elemental iron.

As the pH decreases and ferrous ion concentration increases, the activity of the Metallogenium bacterium is self limiting, and conditions become more nearly conducive for activity of the Thiobacillus ferrooxidans which has an optimal activity below a pH of 3.5. The latter bacterium completes the ferrous to ferric ion oxidation and brings the pH down to around the 1.5 to 2.5 range. Where required, a source of carbon dioxide and nitrogen, typically in the form of ammonium, may be supplied to the bacterium medium to support growth. The resulting biotically-produced ferric ion solution, rich in sulfuric acid, may then be provided to the reaction tank 98 as above described in detail.

The preferred conditions are a pH below about 3.5–4.0 with a pH below 2.5 being particularly preferred. The temperature is preferably in the range of 100°–200°F at atmospheric pressure, with 120°–180°F being particularly preferred.

Waste heat from steam, or water in line 22, may be used via line 106 to maintain the reaction temperature. At these conditions, the predominant precipitate will be Sideronatrite, and where ammonium is present, Ammoniojarosite. As the pH drops into the 1.5 range in reactor 98, the predominant precipitate will be Sideronatrite. As the pH drops still further to the range of 0, Ferrinatrite will precipitate. The Ferrinatrite precipitate is generally water soluble, but on standing in moist air can convert to Sideronatrite. Thus where the pH gets down below the preferred 1.0 range and Ferrinatrite is formed, the underflow may be washed in water or let stand damp to either remove the Ferrinatrite or convert it to Sideronatrite insoluble precipitate.

The preferred pH range for the production of Natrojarosite or Ammoniojarosite is in the range of 1.8 to 2.5, 1.5 to 2.0 for Sideronatrite, and 0 – 1.0 for Ferrinatrite. The ferric ion for all these compounds preferably should be present in a concentration on the order of about 4 grams per liter or above. Excess alkalinity and oxygen should be avoided, since these conditions promote oxidation of iron to iron hydroxide compounds such as $Fe(OH)_2$, $Fe(OH)_3$, or $FeOOH$, which reduce ferrous and ferric ion availability without bringing down sodium and sulfate ions. Further, such hydroxides are gelatinous precipitates which are difficult to separate, dewater or dry.

An important aspect of this invention is the ability to operate at moderately acidic pH's and at low ferric ion concentrations, thereby reducing iron and acid requirements, while pulling down high quantities of sodium and sulfate ions. Operation at moderately acid, oxygenated conditions is made difficult by the relatively easy formation of $Fe(OH)_2$, $Fe(OH)_3$ and $FeOOH$ at such conditions. While these hydroxides are insoluble, the point is not to remove $Fe^{+3}$ from the solution, but to use $Fe^{+3}$ to insolubilize the $Na_2SO_4$. This is aggravated by the fact that it would be easier and cheaper to operate at higher pH's, since less acid would be required, yet the ferrous/ferric hydroxides production is more rapid and complete at such pH values.

The insoluble precipitates of this invention may be selectively produced in the ferrous/ferric hydroxides pH range to the substantial exclusion of such hydroxides by starting the Sideronatrite, Natrojarosite, Ammoniojarosite, etc., precipitation at high $Fe^{+3}$, $Na^{+1}$, $SO_4^{-2}$ concentrations and low pH to suppress ferrous/ferric hydroxides precipitation. This is followed by gradually permitting the pH to rise and the ferric ion concentration to fall. The Sideronatrite, and $NH_4$/Na-jarosites precipitation may thus be extended with good yields into the pH regions where typically one would expect ferrous/ferric hydroxide precipitation to predominate, yet only a minor proportion of those hydroxides form. In the alternative, a low ferric ion concentration, low pH, solution may be seeded with Sideronatrite or $NH_4$/Na-jarosite crystals, and thereafter the pH adjusted to the higher range without substantial yield interference by the $Fe^{+2}/Fe^{+3}$ hydroxides.

AS a source of both sulfuric acid and ferric ion, pyrites leachate is particularly suitable since the instant process provides for disposal of the pyrites leachate which otherwise would pose a pollution problem. At present, a typical coal containing from 2–6 percent sulfur may have removed therefrom by washing at the mine or at the power plant approximately 0.5 percent sulfur in the form of pyritic sulfur. The resulting iron pyrite material is ordinarily disposed of in a mine dump. Over a period of time, however, the iron pyrites may be abiotically or bacterially oxidized to form ferrous and ferric ion, and dilute sulfuric acid from the sulfur contained therein. The resulting mine waste water is a pollutant.

Indeed, both the sulfuric acid and iron content required for the present process can be provided from waste mine water since it typically contains a dilute sulfuric acid and ferrous or ferric ion content. For example, mine waters ordinarily contain about 300 milligrams per liter total iron content and may have a pH below about 5.5, typically on the order of 2.0 to 4.0. Where necessary, these mine waters may be concentrated before charging to reactor tank 98.

In the alternative, an otherwise pre-prepared concentrated solution of ferric sulfate, ferric ion, and/or sulfuric acid is provided through line 102. A typical source of the pre-prepared concentrated solution in line 102 would be a waste pickle liquor from steel manufacture. For example, a typical pickle liquor has a composition 87.1% by weight $H_2O$, 4.6% free $H_2SO_4$, and 8.3% $FeSO_4$ (30.6 g/l) having a pH of about 0.1.

For fossil-fuel fired power plant or smelter, a convenient source of heat and sulfuric acid is to provide a sparger tube 109, to which is provided a slipstream of flue gas at 200°–650°F. This gas also contains $CO_2$ and $SO_x$. The $CO_2$ can provide the bacterial $CO_2$ requirements. Alternately, $CO_2$ 115 from degasser 49 (see FIG. 2) can be sparged in tank 98 as shown in FIG. 5. The $SO_x$ in contact with the water forms sulfurous and sulfuric acid supplying those requirements to the insolubilization system. The sparger bubbles also afford an optional stirring action. Condensate may be withdrawn from the reactor via line 108 and optionally supplied to filter 100 as rinse water 105. Where hydrogen is produced, it may be withdrawn via line 107. Normally, in the case of a preprepared concentrated ferric and/or sulfuric acid solution with the reaction occurring abiotically, hydrogen tends not to be produced.

By comparing the overall reactions for the production of Natrojarosite:

1.) $6Fe° + 6H_2SO_4 \rightarrow 6FeSO_4 + 3H_2$
2.) $6FeSO_4 + 3H_2SO_4 + 3/2O_2 \rightarrow 3Fe_2(SO_4)_3 + 3H_2O$
3.) $3Fe_2(SO_4)_3 + Na_2SO_4 + 12H_2O \rightarrow 2NaFe_3(SO_4)_2(OH_6) + 6H_2SO_4$ Natrojarosite — Recycled with the overall reactions for the production of Sideronatrite:

4.) $2Fe° + 2H_2SO_4 \rightarrow 2FeSO_4 + H_2$
5.) $2FeSO_4 + H_2SO_4 + \frac{1}{2}O_2 \rightarrow Fe_2(SO_4)_3 + H_2O$
6.) $Fe_2(SO_4)_3 +$
$2Na_2SO_4 + 8H_2O \rightarrow 2Na_2Fe(SO_4)_2OH \cdot 3H_2O + H_2O + H_2SO_4$ Sideronatrite — Recycled it can be seen that the overall can factor (the ratio of elemental iron required to sodium ion removed), the acid balance (the amount of sulfuric acid produced minus the amount required), the acid factor (the ratio of sulfuric acid required to elemental iron required), and the iron factor (the ratio of elemental iron required to sodium sulfate disposed of), are each better for Sideronatrite than for Natrojarosite. In Natrojarosite, the can factor is 3 whereas for Sideronatrite the factor is 0.5, with the lower the factor number the better the operation. Likewise, only two moles of acid are needed in the production of Sideronatrite as compared to three moles required in the production of Natrojarosite. Likewise the acid factor in Sideronatrite is 1.0 whereas the factor for Natrojarosite is 3.0. The iron factor of Natrojarosite is 6 whereas for Sideronatrite the factor is only 1. Both the acid factor and iron factor (twice the can factor) give a feel for how much raw material in terms of sulfuric acid and scrap are required to remove the sodium sulfate and thereby the insolubilize it. The lower these factors, the cheaper the process tends to be depending on availability of iron and sulfuric acid sources. Offsetting this is the difficulty of the reaction to produce Sideronatrite at the more acid pH, but this can be ameliorated as noted by concentration and pH control or seeding during processing.

The pyrite oxidation, or two stage pyrite degradation, which occurs in the pyrites or pyrites-iron scrap dump may be represented by equations 7, 8, and 9 as follows:
Pyrite Oxidation:

7) $FeS + 7/2 O_2 + H_2O \rightarrow Fe^{+2} + 2SO_4^{-2} + 2H^+$
Pyrite Degradation:
8) $Fe^{+2} + \frac{1}{4}O_2 + H^+ \rightarrow Fe^{+3} + \frac{1}{2}H_2O$
9) $FeS + 14Fe^{+3} + 8H_2O \rightarrow 15Fe^{+2} + SO_4^{-2} + 16H^+$ It should be understood that while the precipitates may be predominantly Natrojarosite or Sideronatrite, they may include Metasideronatrite, Ferrinatrite, Depegite, Ammoniojarosite, Rosarite, and Iriite or a mixed precipitate, and/or other metal-containing analogs of hydrated or anhydrous basic sodium or ammonium-containing metallic sulfates or sulfites such as Plumbojarosite, Argentojarosite, Beaverite, Alunite, Natroalunite, and the like, depending on the "sulfate" wastes heavy metals content, or the content of such metals in any of the other reactants, be they fly ash, ash tank waste water, black water, leachate, pickle liquor or the like.

It should be understood the heavy metals content can be subjected to various mineral beneficiation or metallurgical methods and the like, for the separation and recovery of valuable heavy metals or heavy metal-bearing by-products.

The precipitated heavy metal or sodium hydroxy ferric sulfates of sulfites are removed via line 99 as an underflow and filtered to remove excess entrained liquor in separator 100. This separator may be a screen filter, metal fabric or fibrous filter, a vacuum filter, or, preferably, a centrifuge. The precipitate cake is rinsed in one or more stages by input of water 105 and the expressed water, wash water, or decantate is recycled to the reaction tank 98 via line 101. The moist or dried filtrate 110 is disposed of as by conventional land fill.

To prevent build-up of acidity or sodium ion concentration, a slipstream 111 may be passed through suitable ion exchange resins 112, and the clarified water returned to rinse 105 or via line 31 to discharge basin 8. Regenerant 113 is cycled through the resin in conventional manner, and the spent regenerant back wash wastes 114 may be combined in neutralization tank 13 with wastes 12, 17, 18 or recycled directly, alone or with wastes 19 and 29, to the reaction tank 98. This system polishes excess water in the insolubilization system. The resin may be a cation exchange resin alone or with an iron filter, in the hydrogen form for pick up of sodium. Mixed beds may be used for pH control to substantially ambient ground water neutral range values (pH6–8).

The solubility at room temperature of the end product Sideronatrite is 0.16g/liter based on the iron analysis and 0.55 g/l based on sodium analysis. The solubility of the end product Natrojarosite is 0.02 g/l based on the iron analysis and 0.37 g/l based on sodium. The iron analysis is considered more reliable because of the difficulty of washing entrained sodium ion from the precipitate. These compare favorably to the following reported solubilities:

Table V

| Component | Relative Solubilities Solubility & Conditions |
|---|---|
| Anhydrous $Na_2SO_4$ | |
| Monoclinic columnar | 488g/l at 40°C |
| Rhombic (Thenardite) | 427g/l at 100°C; 47.6g/l at 0°C |
| $Na_2SO_4 \cdot 10H_2O$ (Glaubers Salt) | 110g/l at 0°C |
| $Na_2SO_4 \cdot 7H_2O$ | 195g/l at 0°C |
| $Na_2SO_3 \cdot 7H_2O$ | 328g/l at 0°C |
| $Na_2SO_3$ anhydrous | 125.4g/l at 0°C |
| $CaSO_4 \cdot 2H_2O$ | 2.3g/l at R.T. |
| $CaSO_3 \cdot 2H_2O$ | .043g/l at R.T. |
| $MgSO_4 \cdot 7H_2O$ | 710g/l |
| Sideronatrite (based on Fe) | .16g/l at R.T. |
| Natrojarosite (based on Fe) | .02g/l at R.T. |
| Ammoniojarosite (based on Fe) | .009g/l at R.T. |
| Natroalunite (based on Al) | 0.16g/l at R.T. |

The following specific examples show insolubilization of blowdown magma and demineralizer system wastes respectively.

EXAMPLE 1

A solution having the composition of blowdown magma sludge 29 (FIG. 4) as set forth in Table IV is prepared by dissolving the following in 500 ml$H_2O$:

Table VI

| Component | Amount (grams) |
|---|---|
| $SiO_2$ | 0.3 |
| $CaCl_2$ | 0.55 |
| $MgCl_2.6H_2O$ | 0.96 |
| NaCl | 15.5 |
| $Na_2SO_4$ | 84.3 |
| $CuCl_2$ | 0.01 |
| $ZnCl_2$ | 0.01 |

To 100 ml of this solution is added 50 ml of 0.125 molar $Fe_2(SO_4)_3$. The pH was 2.35 and required no adjustment with additional sulfuric acid. The solution was heated to 140°F and maintained for about 25 hours (an additional ½ hour was estimated as required for heat up). A red-brown precipitate formed which was washed twice with distilled water. The wash water was clear, indicating an insoluble precipitate. Upon analysis the precipitate contained Natrojarosite and Goethite, (FeOOH), as identified above.

EXAMPLE 2

As a working example, demineralizer system wastes solution such as found in neutralization tank 13, see Table I, may be prepared in the manner set forth in specific Example 1, by dissolution of appropriate molar amounts of $SiO_2$, $CaCl_2$, $MgCl_2$, NaF, NaCl, KOH, $AsCl_3$, $Na_2SO_4$, NaOH. $Fe_2(SO_4)_3$ may be added as in Example 1 and pH adjusted to 1.5–2.5 with $H_2SO_4$ if necessary. The solution may be heated below 200°F as in Example 1, with formation of precipitate which may include: Natrojarosite, Metasideronatrite, Sideronatrite, Depegite, Rosarite, Iriite (at pH 2.2–5.5), and mixtures thereof.

EXAMPLE 3

As a second working example, the effluent from cation or anion exchangers, such as in lines 12 and 17 of FIG. 3, (see Table II) may be treated to produce Natrojarosite, Metasideronatrite, Sideronatrite or mixed precipitates under acidic conditions (pH < 2.5) with addition of $Fe_2(SO_4)$ and/or sulfuric acid - ferric solution in the 120°–180°F range as in Examples 1 or 2.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. A water pollution control process for reducing the water solubility of sodium and ammonium sulfur oxide wastes comprising the steps of:
   a. reacting a sulfur oxide anion selected from a sulfate, a sulfite and mixtures thereof, and a sodium or ammonium cation, with a source containing iron values selected from Fe°, $Fe^{+2}$, $Fe^{+3}$ and mixtures thereof,
   b. said sulfur oxide anion being a waste produced in a process of demineralizing water,
   c. maintaining said reaction at a pH below about 5.5 and at a temperature in the range of about 50°–300°F for a time sufficient to form a compound selected from:

$Q_vFe_w(SO_x)_y(OH)_z \cdot nH_2O$, where Q is $NH_4$ or Na, $v$ is selected from 1, 2, 4, or 5, $w$ is selected from 1, 2, 3, 4 or 6, $x$ is selected from 3 and/or 4, $y$ is selected from 2, 4 or 5, $z$ is selected from 1, 2, 3, 6 or 12, $n$ is selected from 0 or 3, and mixtures thereof, and
   d. said compound exhibiting solubility, measured with respect to ferric ion, of less than about 2.3 g/l at 0°C.

2. A water pollution control process as in claim 1 wherein said water demineralization process is selected from demineralizing feed or waste waters used in, or produced by, industrial or power plant operations.

3. A water pollution control process as in claim 2 wherein the pH is maintained below about 3.5 and the temperature in the range of from about 120°–200°F.

4. A water pollution control process as in claim 3 wherein the pH is maintained below about 2.5.

5. A water pollution control process as in claim 1 wherein said iron source is an aqueous solution containing iron ions selected from ferrous ions, ferric ions, and mixtures thereof.

6. A water pollution control process as in claim 5 wherein the pH is maintained below about 2.5.

7. A water pollution control process as in claim 3 wherein said water demineralization process is a process for demineralizing cooling tower water to produce a blowdown magma rich in sodium and sulfur oxide values.

8. A water pollution control process as in claim 3 wherein said water demineralization process waste is selected from wastes from processes for demineralizing raw water, make-up water, boiler feed water, condenser water, and coolant water.

9. A water pollution control process as in claim 1 wherein said iron-containing source iron is in an elemental or combined state.

10. A water pollution control process as in claim 9 which includes the step of oxidizing said iron to the ferrous state, ferric state or mixtures thereof.

11. A water pollution control process as in claim 10 wherein said oxidation takes place in the presence of acid tolerant, iron-oxidizing bacteria.

12. A water pollution control process as in claim 2 wherein said reaction occurs in a plurality of zones.

13. A water pollution control process as in claim 12 wherein said iron source includes iron in an elemental, ferrous or combined state, or mixtures thereof, which iron is oxidized to the ferrous state, ferric state or mixtures thereof in a zone separate from a zone wherein said compound is formed.

14. A water pollution control process as in claim 13 wherein said sulfur oxide anion, sodium cation, ammonium cation, or mixtures thereof, are added to a first heated zone separately from a second zone in which ferric ion is prepared biotically or abiotically.

15. A water pollution control process as in claim 14 wherein said second zone includes biotic preparation of ferric ion and sulfuric acid.

16. A water pollution control process as in claim 15 wherein said second zone includes at least two stages, each being maintained at a different pH for biotic oxidation of $Fe^0$ to $Fe^{+2}$ in a first stage thereof, and $Fe^{+2}$ to $Fe^{+3}$ in a second stage.

17. A water pollution control process as in claim 1 wherein maintaining said reaction includes the steps of:
a. commencing said reaction at a pH below a pH conducive to the formation of ferrous or ferric hydroxides to form at least some of said compound,
b. adjusting the pH upward to within at least the lower end of the range of pH at which production of one or more of said hydroxides could occur, while reducing the ferric ion concentration, and
c. selectively forming said compound in the absence of substantial production of said hydroxides.

18. A water pollution control process as in claim 17 which includes the step of seeding said reaction with crystals of said compound prior to raising said pH.

19. A water pollution control process as in claim 18 wherein the pH is maintained below about 5.5 and the temperature in the range of from about 120°–180°F.

20. A water pollution control process as in claim 2 wherein said iron is an aqueous solution of ferrous ion, ferric ion, and mixtures thereof, and said acid is sulfuric acid.

21. A water pollution control process as in claim 20 wherein said iron and sulfuric acid sources are selected from waste acid, steel pickle liquor, scrap iron, iron-bearing slag, pyrites, acid mine water, black water, gob, pyrites leachate, fly ash, $SO_2$ and $SO_3$-containing flue gas, and mixtures thereof.

22. A water pollution control process as in claim 21 wherein said reaction takes place in an aqueous medium, and said $SO_2$ and $SO_3$-containing flue gas is sparged in said aqueous reaction medium to provide both heat and said acid values.

* * * * *